United States Patent
Shin et al.

(10) Patent No.: US 11,380,323 B2
(45) Date of Patent: Jul. 5, 2022

(54) INTELLIGENT PRESENTATION METHOD

(71) Applicant: LG ELECTRONICS INC., Seoul (KR)

(72) Inventors: Wonho Shin, Seoul (KR); Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 299 days.

(21) Appl. No.: 16/692,828

(22) Filed: Nov. 22, 2019

(65) Prior Publication Data

US 2020/0090658 A1   Mar. 19, 2020

(30) Foreign Application Priority Data

Aug. 2, 2019   (KR) .................. 10-2019-0094583

(51) Int. Cl.
| | |
|---|---|
| *G06F 40/30* | (2020.01) |
| *G10L 15/22* | (2006.01) |
| *G10L 15/18* | (2013.01) |
| *H04W 72/12* | (2009.01) |
| *G06N 3/04* | (2006.01) |
| *G06N 3/08* | (2006.01) |
| *H04W 84/04* | (2009.01) |
| *G10L 15/183* | (2013.01) |
| *G06F 40/35* | (2020.01) |

(52) U.S. Cl.
CPC .............. *G10L 15/22* (2013.01); *G06F 40/30* (2020.01); *G06N 3/04* (2013.01); *G06N 3/08* (2013.01); *G10L 15/1815* (2013.01); *H04W 72/1268* (2013.01); *H04W 72/1289* (2013.01); *G06F 40/35* (2020.01); *G10L 15/183* (2013.01); *G10L 15/1822* (2013.01); *G10L 2015/223* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 8,571,851 | B1* | 10/2013 | Tickner | G10L 15/1815 704/9 |
| 9,147,399 | B1* | 9/2015 | Hart | G10L 17/08 |
| 9,338,493 | B2* | 5/2016 | Van Os | G06F 3/167 |
| 2003/0167167 | A1* | 9/2003 | Gong | G10L 15/22 704/250 |
| 2009/0181659 | A1* | 7/2009 | Stalnacke | H04L 12/66 455/416 |
| 2013/0339031 | A1* | 12/2013 | Yoon | G06F 3/165 704/275 |

(Continued)

*Primary Examiner* — Richard Z Zhu
(74) *Attorney, Agent, or Firm* — Birch, Stewart, Kolasch & Birch, LLP

(57) ABSTRACT

Disclosed is an intelligent presentation method. The intelligent presentation method of the present disclosure may support a presentation to be smoothly performed by learning content of the presentation while a presenter is presenting and performing a function required for the presentation in response to a command voice. The intelligent presentation-assisting device of the present disclosure may be associated with an artificial intelligence module, a robot, an augmented reality (AR) device, a virtual reality (VR) device, a device related to a 5G service, and the like.

14 Claims, 14 Drawing Sheets

(56) References Cited

U.S. PATENT DOCUMENTS

| | | | |
|---|---|---|---|
| 2015/0348551 A1* | 12/2015 | Gruber | H04M 3/4936 |
| | | | 704/235 |
| 2016/0239489 A1* | 8/2016 | Cunico | G06F 16/435 |
| 2016/0275952 A1* | 9/2016 | Kashtan | H04M 3/563 |
| 2018/0032997 A1* | 2/2018 | Gordon | G06Q 30/0269 |
| 2018/0039951 A1* | 2/2018 | Wynn | G06Q 10/1095 |
| 2018/0301141 A1* | 10/2018 | Altaf | G06N 5/025 |
| 2019/0251961 A1* | 8/2019 | Wang | G10L 15/1815 |
| 2020/0092519 A1* | 3/2020 | Shin | G10L 17/00 |
| 2021/0005200 A1* | 1/2021 | Tanaka | G06Q 50/00 |
| 2021/0103619 A1* | 4/2021 | Tsunomori | G06F 3/167 |
| 2021/0312919 A1* | 10/2021 | Sato | G06F 16/288 |

* cited by examiner

INTELLIGENT PRESENTATION METHOD

CROSS-REFERENCE TO RELATED APPLICATIONS

This application claims the priority benefit of Korean Patent Application No. 10-2019-0094583 filed in the Republic of Korea on Aug. 2, 2019, which is incorporated herein by reference for all purposes as if fully set forth herein.

BACKGROUND OF THE INVENTION

Field of the Invention

The present disclosure relates to an intelligent presentation method, and more particularly to, an intelligent presentation method that may support a presentation to be smoothly performed by learning content of the presentation while a presenter is presenting and performing a function required for the presentation in response to a command voice.

Related Art

An interactive artificial intelligence is a program aimed at simulating conversations with humans via voice or text. Such interactive artificial intelligences are classified into a Q&A system, an intelligent search, a conversation companion, a personal assistant, and the like based on an intelligence acquisition scheme and information exchange scheme. Commercially available interactive artificial intelligence focuses on detecting specific words or phrases on an input and outputting prepared responses. Most commonly used personal assistant-type artificial intelligence has recently been built into smartphones often as a standard feature. Current personal assistant-type artificial intelligence is mostly based on a character set by a manufacturer.

In this connection, the interactive artificial intelligence was developed in a manner to allow a virtual character to communicate with a user in a virtual space, and to automatically select a conversation partner suitable for the user and connect the conversation partner with the user. For example, a configuration of conducting a conversation in a video conference manner in real time among a plurality of users includes an interactive agent. A conventional interactive agent was not be able to handle continuous conversations because the conventional interactive agent takes a manner of learning and processing a sentence as a basic unit. Further, the conventional interactive agent was not be able to answer questions that are not defined in advance because the conventional interactive agent proceeds focusing on performing defined functions rather than understanding a conversation situation.

SUMMARY OF THE INVENTION

The present disclosure aims to solve the aforementioned needs and/or problems.

Further, an intelligent presentation method of the present disclosure is aimed to support a presentation to be smoothly performed by learning content of the presentation while a presenter is presenting and performing a function required for the presentation in response to a command voice.

In an aspect, an intelligent presentation method including learning presentation content presented by a presenter, recognizing a command voice of the presenter that utters in the learned presentation content, analyzing an intent of the recognized command voice of the presenter, and executing a function corresponding to the analyzed command voice of the presenter or responding to the command voice is provided.

In one implement, the intelligent presentation method may further include recognizing the presentation content displayed on a screen as a text, and executing the function corresponding to the command voice of the presenter or responding to the command voice based on the recognized text.

In one implement, the intelligent presentation method may further include converting the presentation content uttered by the presenter into a text, and executing the function corresponding to the command voice of the presenter or responding to the command voice based on the converted text.

In one implement, the learning of the presentation content may include learning the presentation content by acquiring first voice data uttered by the presenter and extracting feature values of a first voice from the acquired first voice data.

In one implement, the recognizing of the command voice of the presenter may include comparing the learned feature values of the first voice with the command voice of the presenter, and when the comparison result is included in a set voice range, recognizing the command voice of the presenter.

In one implement, the recognizing of the command voice of the presenter may include comparing the learned feature values of the first voice with the command voice of the presenter, and when the comparison result is not included in a set voice range, not recognizing the command voice of the presenter.

In one implement, the intelligent presentation method may further include determining the presenter as a speaker and learning utterance content uttered from the speaker when the command voice of the presenter is not recognized, wherein the learning of the utterance content uttered by the speaker may include learning the utterance content by acquiring second voice data uttered by the speaker and extracting feature values of a second voice from the acquired second voice data.

In one implement, the intelligent presentation method may further include recognizing a command voice of the speaker in the learned utterance content, analyzing an intent of the recognized command voice of the speaker, and executing a function corresponding to the analyzed command voice of the speaker or responding to the command voice.

In one implement, wherein the recognizing of the command voice of the speaker may include comparing the learned feature values of the second voice with the command voice of the speaker, and when the comparison result is included in a set voice range, recognizing the command voice of the speaker.

In one implement, the intelligent presentation method may further include obtaining the command voice of the presenter related to a situation in which the presenter utters, applying the command voice of the presenter to a pre-trained command voice recognition, determination, and classification model, determining whether a situation in which the command voice of the presenter is recognized is correct based on the application result, and analyzing the intent of the command voice of the presenter based on the determination result.

In one implement, the command voice recognition, determination, and classification model may be stored in an external artificial intelligence (AI) device, and wherein the command voice recognition, determination, and classification model may transmit, to the external AI device, feature values related to information related to the situation in which the command voice of the presenter is recognized, and obtain, from the external AI device, the result of applying the command voice of the presenter to the command voice recognition, determination, and classification model.

In one implement, the command voice recognition, determination, and classification model may be stored in a 5G network, wherein the command voice recognition, determination, and classification model may transmit, to the 5G network, information related to the situation in which the command voice of the presenter is recognized, and receive, from the 5G network, the result of applying the command voice of the presenter to the command voice recognition, determination, and classification model.

In one implement, the intelligent presentation method may further include receiving, from the 5G network, downlink control information (DCI) used to schedule transmission of the information related to the situation in which the command voice of the presenter is recognized, and wherein the information related to the situation in which the command voice of the presenter is recognized may be transmitted to the 5G network based on the DCI.

In one implement, the intelligent presentation method of claim may further include performing an initial access procedure to the 5G network based on a synchronization signal block (SSB), wherein the information related to the situation in which the command voice of the presenter is recognized may be transmitted to the 5G network through a physical uplink shared channel (PUSCH), and wherein a demodulation-reference signal (DM-RS) of the SSB and the PUSCH may be QCLed (quasi co-located) for a QCL type D.

In one implement, the intelligent presentation method may further include controlling a communication unit to transmit the information related to the situation in which the command voice of the presenter is recognized to an AI processor included in the 5G network, and controlling the communication unit to receive AI processed information from the AI processor, wherein the AI processed information may be information determined whether the command voice of the presenter is recognized.

The accompanying drawings included as a part of the detailed description to assist in understanding the present disclosure provide embodiments of the present disclosure and describe technical features of the present disclosure together with the detailed description.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
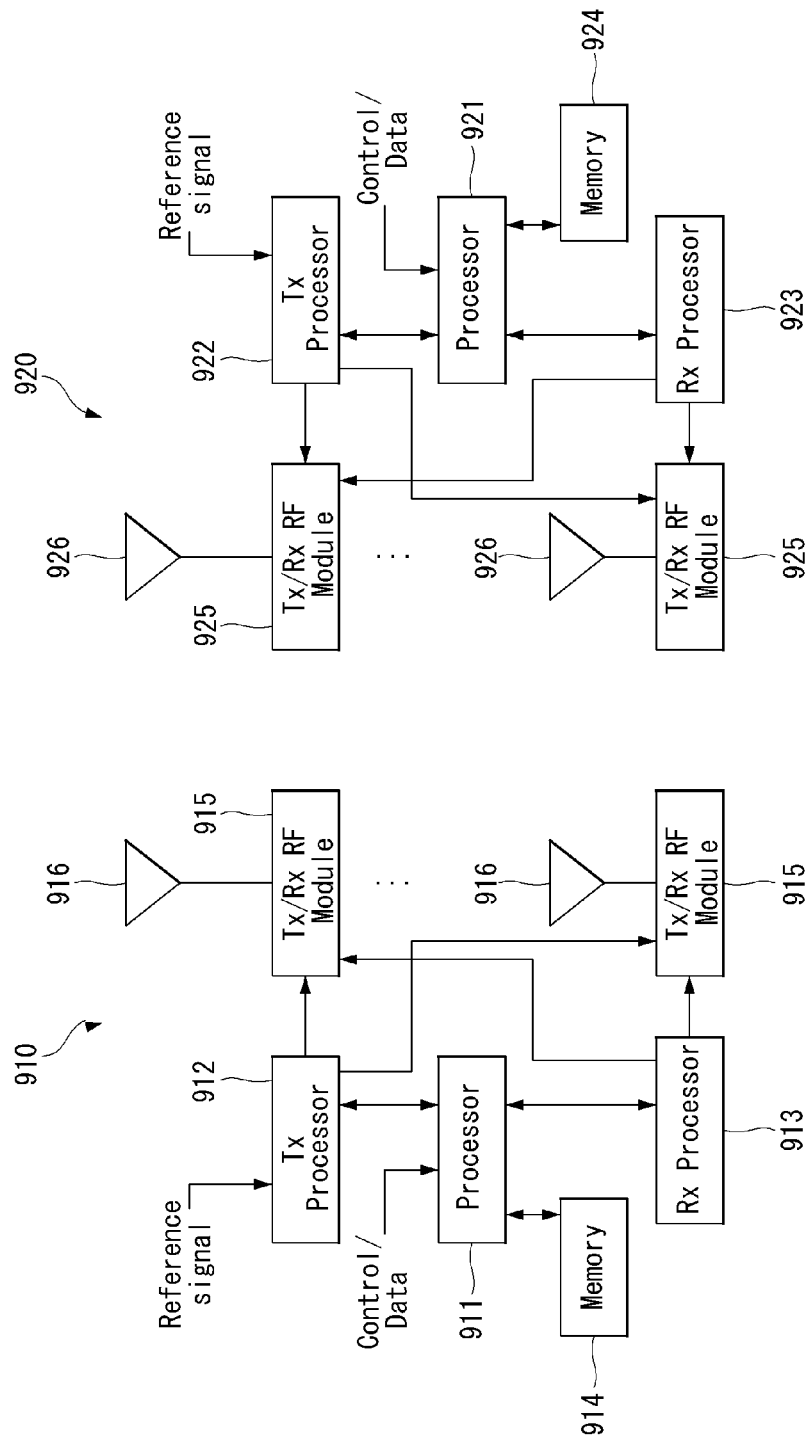
FIG. 1 illustrates a block diagram of a wireless communication system to which methods proposed herein may be applied.

FIG. 1 is a block diagram of a wireless communication system to which methods proposed in the disclosure are applicable.

Referring to FIG. 1, a robot is defined as a first communication device 910, and a processor 911 can perform detailed operations of the robot.

A 5G network communicating with the robot is defined as a second communication device 920, and a processor 921 can perform detailed autonomous operations. Here, the 5G network may include another robot communicating with the robot.

The 5G network may be represented as the first communication device, and the robot may be represented as the second communication device.

For example, the first communication device or the second communication device may be a base station, a network node, a transmission terminal, a reception terminal, a wireless device, a wireless communication device, a robot, or the like.

For example, a terminal or user equipment (UE) may include a robot, a drone, a unmanned aerial vehicle (UAV), a cellular phone, a smart phone, a laptop computer, a digital broadcast terminal, a personal digital assistant (PDA), a portable multimedia player (PMP), a navigation device, a slate PC, a tablet PC, an ultrabook, a wearable device (e.g., a smart watch, a smart glass and a head mounted display (HMD)), etc. For example, the HIVID may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
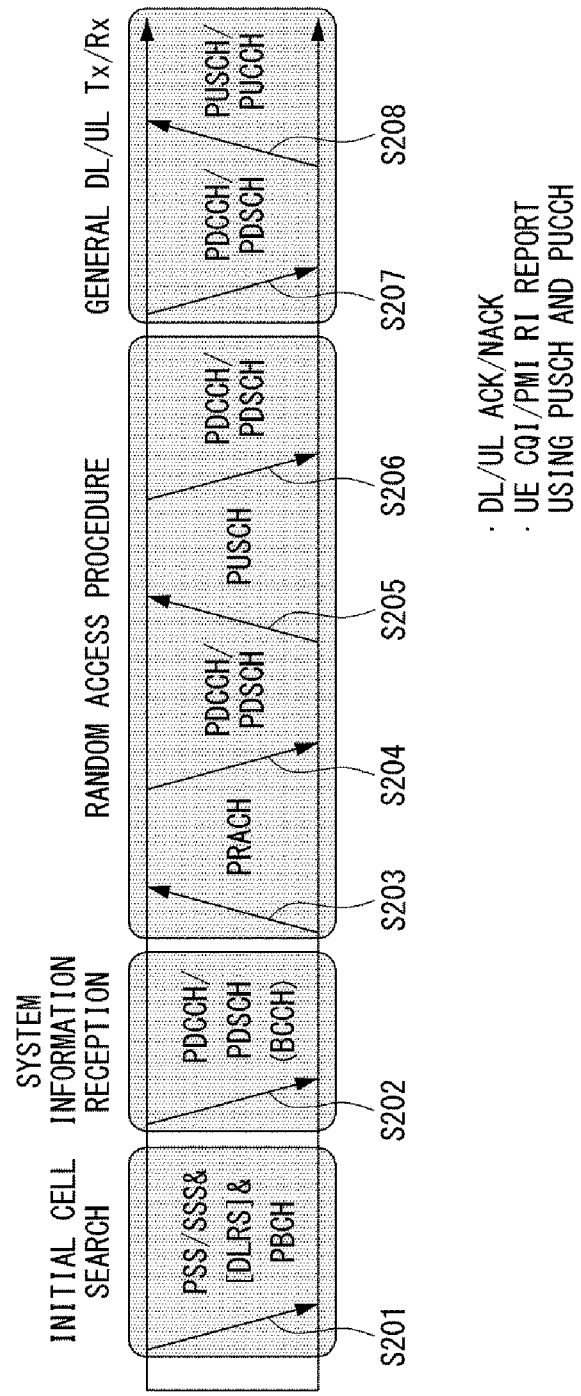
FIG. 2 illustrates an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent path loss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.
Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) returning from a first frequency resource to a second frequency resource is performed in a guard period and the specific information and the response to the specific information can be transmitted/received through a narrowband (e.g., 6 resource blocks (RBs) or 1 RB).

F. Basic Operation Between Robots Using 5G Communication

Figure 3:
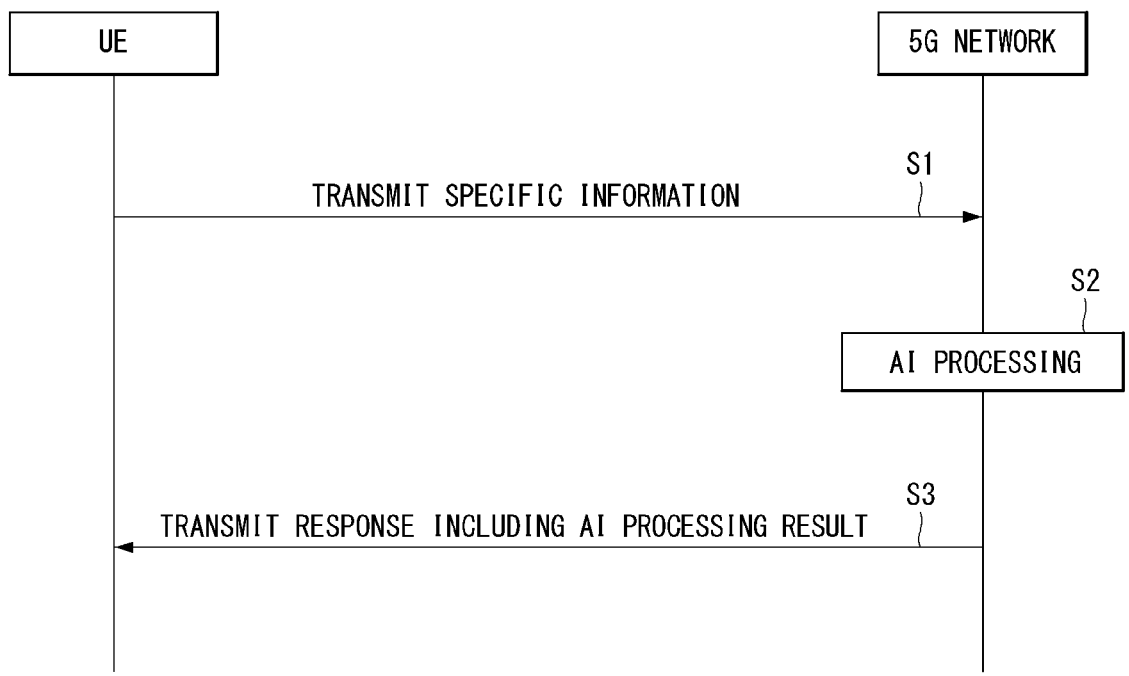
FIG. 3 illustrates an example of basic operations of a user terminal and a 5G network in a 5G communication system.

FIG. 3 shows an example of basic operations of a robot and a 5G network in a 5G communication system.

The robot transmits specific information to the 5G network (S1). The specific information may include autonomous driving related information. In addition, the 5G network can determine whether to remotely control the robot (S2). Here, the 5G network may include a server or a module which performs remote control related to autonomous driving. In addition, the 5G network can transmit information (or signal) related to remote control to the robot (S3).

G. Applied Operations Between Autonomous Robot and 5G Network in 5G Communication System Hereinafter, the operation of a robot using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the robot performs an initial access procedure and a random access procedure with the 5G network prior to step S1 of FIG. 3 in order to transmit/receive signals, information and the like to/from the 5G network.

More specifically, the robot performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the robot receives a signal from the 5G network.

In addition, the robot performs a random access procedure with the 5G network for UL synchronization acquisition and/or UL transmission. The 5G network can transmit, to the robot, a UL grant for scheduling transmission of specific information. Accordingly, the robot transmits the specific information to the 5G network on the basis of the UL grant. In addition, the 5G network transmits, to the robot, a DL grant for scheduling transmission of 5G processing results with respect to the specific information. Accordingly, the 5G network can transmit, to the robot, information (or a signal) related to remote control on the basis of the DL grant.

Next, a basic procedure of an applied operation to which a method proposed by the present disclosure which will be described later and URLLC of 5G communication are applied will be described.

As described above, a robot can receive DownlinkPreemption IE from the 5G network after the robot performs an initial access procedure and/or a random access procedure with the 5G network. Then, the robot receives DCI format 2_1 including a preemption indication from the 5G network on the basis of DownlinkPreemption IE. The robot does not perform (or expect or assume) reception of eMBB data in resources (PRBs and/or OFDM symbols) indicated by the preemption indication. Thereafter, when the robot needs to transmit specific information, the robot can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the robot receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the robot transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
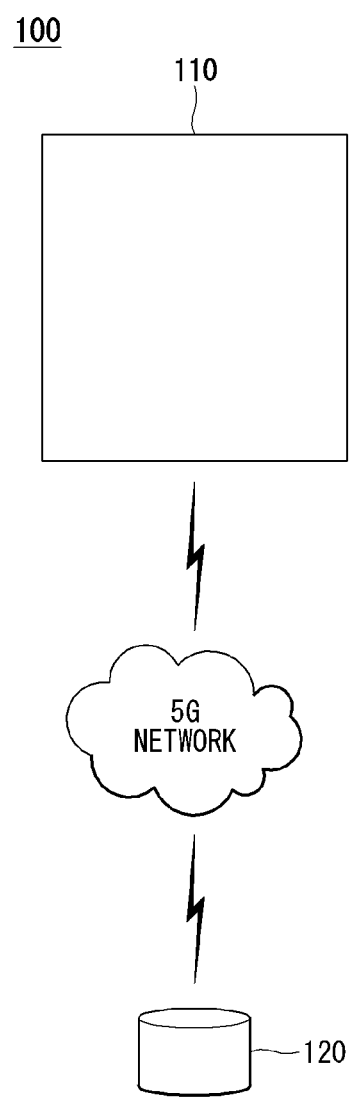
FIG. 4 illustrates an intelligent presentation device according to an embodiment of the present disclosure.

FIG. 4 illustrates an intelligent presentation device according to an embodiment of the present disclosure.

Referring to FIG. 4, an intelligent presentation device 100 according to an embodiment of the present disclosure may transmit or receive signals and information using a 5G network.

The intelligent presentation device 100 may include an intelligent presentation-assisting device 120 and a display device 110.

The intelligent presentation-assisting device 120 may learn presentation content presented by a presenter, recognize a command voice of the presenter that utters among the learned presentation content, analyze an intent of the recognized presenter's command voice, and perform a function or respond corresponding to the analyzed command voice of the presenter.

The display device 110 may be electrically connected to the intelligent presentation-assisting device 120. The display device 110 may display the presentation content. The display device 110 may display the function or response corresponding to the command voice of the presenter under control of the intelligent presentation-assisting device 120.

Figure 5:
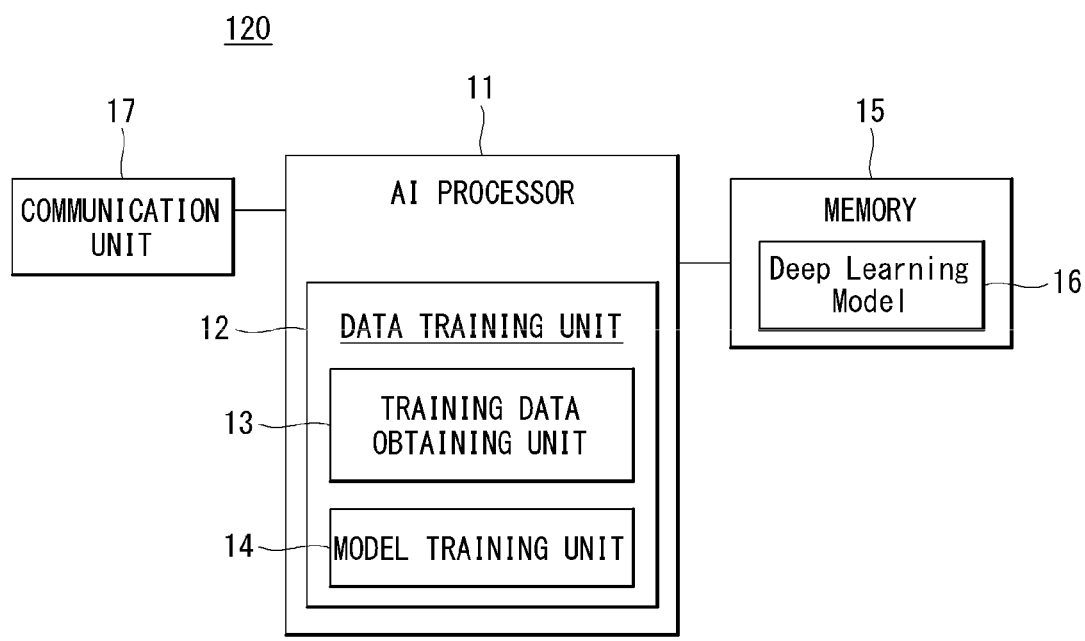
FIG. 5 is a block diagram of an artificial intelligence (AI) device according to an embodiment of the present disclosure.

FIG. 5 is a block diagram of an AI device according to an embodiment of the present disclosure.

An AI device 120 may include an electronic device including an AI module capable of performing AI processing, or a server including the AI module, or the like. Further, the AI device 120 may be included as at least some components of the intelligent presentation-assisting device 120 illustrated in FIG. 4 and perform together at least a part of the AI processing.

The AI processing may include all operations related to driving of the intelligent presentation-assisting device 120 illustrated in FIG. 5. For example, the intelligent presentation-assisting device 120 can perform AI processing on image signals or sensing data to perform processing/decision operation and a control signal generation operation.

The AI device 120 may include an AI processor 11, a memory 15, and/or a communication unit 17.

The AI device 120 is a computing device capable of learning a neutral network and may be implemented as various electronic devices including a server, a desktop PC, a notebook PC, a tablet PC, and the like.

The AI processor 11 may learn a neural network using a program stored in the memory 15. In particular, the AI processor 11 may learn a neural network for intelligent presentation device related data. For example, the AI processor 11 may learn a neural network for recognizing contextual information related to the command voice of the presenter that utters.

Here, the neural network for recognizing the robot related data may be designed to emulate a human brain structure on a computer and may include a plurality of network nodes with weight that emulate neurons in a human neural network. The plurality of network nodes may send and receive data according to each connection relationship so that neurons emulate the synaptic activity of neurons sending and receiving signals through synapses. Here, the neural network may include a deep learning model, which has evolved from a neural network model. In the deep learning model, the plurality of network nodes may be arranged in different layers and may send and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

A processor performing the above-described functions may be a general purpose processor (e.g., CPU), but may be AI-dedicated processor (e.g., GPU) for AI learning.

The memory 15 may store various programs and data required for the operation of the AI device 120. The memory 15 may be implemented as a non-volatile memory, a volatile memory, a flash memory, a hard disk drive (HDD), or a solid state drive (SSD), etc. The memory may be accessed by the AI processor 11, and the AI processor 11 may read/write/modify/delete/update data. Further, the memory 15 may store a neural network model (e.g., deep learning model 16) created by a learning algorithm for data classification/recognition according to an embodiment of the present disclosure.

The AI processor 11 may further include a data learning unit 12 for learning a neural network for data classification/recognition. The data learning unit 12 may learn criteria as to which learning data is used to decide the data classification/recognition and how data is classified and recognized using learning data. The data learning unit 12 may learn a deep learning model by acquiring learning data to be used in learning and applying the acquired learning data to the deep learning model.

The data learning unit 12 may be manufactured in the form of at least one hardware chip and mounted on the AI device 120. For example, the data learning unit 12 may be manufactured in the form of a dedicated hardware chip for artificial intelligence (AI), or may be manufactured as a part of a general purpose processor (e.g., CPU) or a graphic-dedicated processor (e.g., GPU) and mounted on the AI device 120. Further, the data learning unit 12 may be implemented as a software module. If the data learning unit 12 is implemented as the software module (or a program module including instruction), the software module may be stored in non-transitory computer readable media. In this case, at least one software module may be provided by an operating system (OS), or provided by an application.

The data learning unit 12 may include a learning data acquisition unit 13 and a model learning unit 14.

The learning data acquisition unit 13 may acquire learning data required for a neural network model for classifying and recognizing data. For example, the learning data acquisition unit 13 may acquire, as learning data, vehicle data and/or sample data to be input to a neural network model.

By using the acquired learning data, the model learning unit 14 may learn so that the neural network model has a criteria for determining how to classify predetermined data. In this instance, the model learning unit 14 may train the neural network model through supervised learning which uses at least a part of the learning data as the criteria for determination. Alternatively, the model learning unit 14 may train the neural network model through unsupervised learning which finds criteria for determination by allowing the neural network model to learn on its own using the learning data without supervision. Further, the model learning unit 14 may train the neural network model through reinforcement learning using feedback about whether a right decision is made on a situation by learning. Further, the model learning unit 14 may train the neural network model using a learning algorithm including error back-propagation or gradient descent.

If the neural network model is trained, the model learning unit 14 may store the trained neural network model in the memory. The model learning unit 14 may store the trained neural network model in a memory of a server connected to the AI device 120 over a wired or wireless network.

The data learning unit 12 may further include a learning data pre-processing unit (not shown) and a learning data selection unit (not shown), in order to improve a result of analysis of a recognition model or save resources or time required to create the recognition model.

The learning data pre-processing unit may pre-process obtained data so that the obtained data can be used in learning for deciding the situation. For example, the learning data pre-processing unit may process obtained learning data into a predetermined format so that the model learning unit 14 can use the obtained learning data in learning for recognizing images.

Moreover, the learning data selection unit may select data required for learning among learning data obtained by the learning data acquisition unit 13 or learning data pre-processed by the pre-processing unit. The selected learning data may be provided to the model learning unit 14. For example, the learning data selection unit may detect a specific area in an image obtained with a camera of a robot to select only data for objects included in the specific area as learning data.

In addition, the data learning unit 12 may further include a model evaluation unit (not shown) for improving the result of analysis of the neural network model.

The model evaluation unit may input evaluation data to the neural network model and may allow the model learning unit 12 to learn the neural network model again if a result of analysis output from the evaluation data does not satisfy a predetermined criterion. In this case, the evaluation data may be data that is pre-defined for evaluating the recognition model. For example, if the number or a proportion of evaluation data with inaccurate analysis result among analysis results of the recognition model learned on the evaluation data exceeds a predetermined threshold, the model evaluation unit may evaluate the analysis result as not satisfying the predetermined criterion.

A communication unit 17 may transmit an AI processing result by the AI processor 11 to the intelligent presentation device.

In an example, the intelligent presentation-assisting device 120 may be implemented by being functionally embedded in a processor provided in the intelligent presentation device. In addition, the 5G network may include a server or a module that performs the AI processing.

Figure 6:
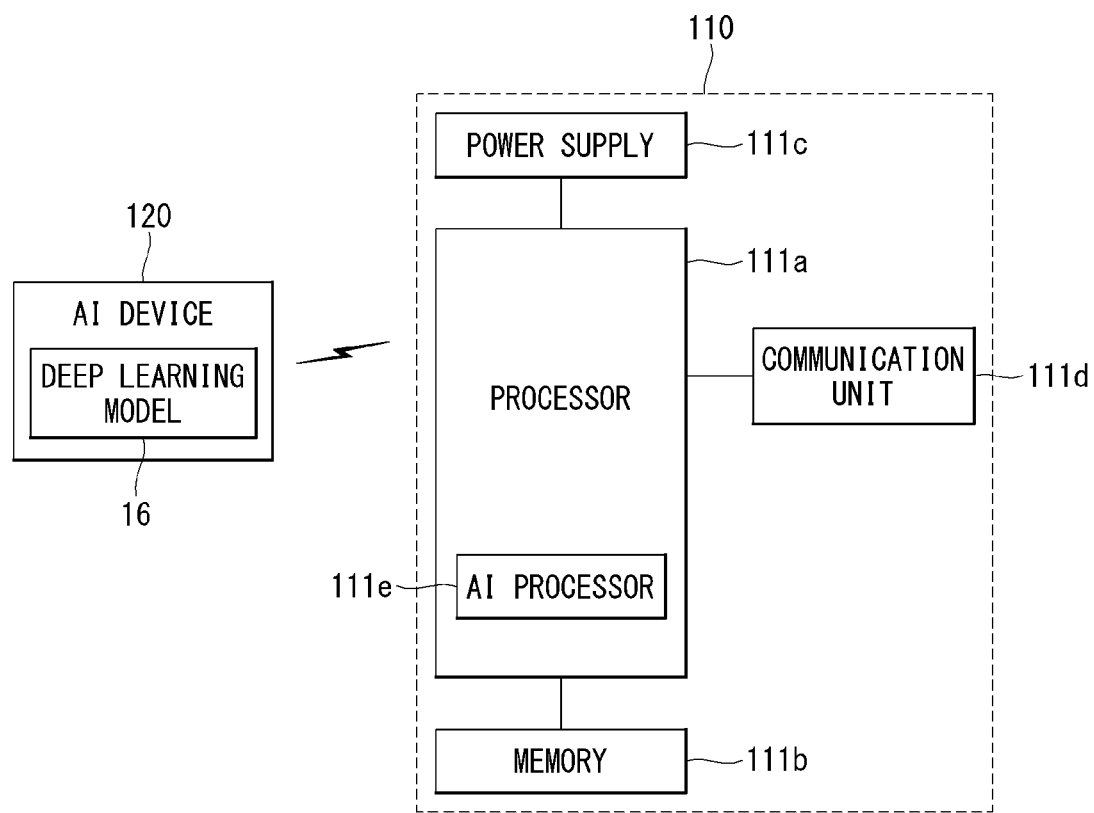
FIG. 6 is a diagram for illustrating a system in which an intelligent device and an AI device are linked according to an embodiment of the present disclosure.

Although the AI device 120 illustrated in FIG. 6 was functionally separately described into the AI processor 11, the memory 15, the communication unit 17, etc., the above components may be integrated into one module and referred to as an AI module.

A communication unit 17 may transmit an AI processing result by the AI processor 11 to the intelligent presentation device.

In an example, the intelligent presentation-assisting device 120 may be implemented by being functionally embedded in a processor provided in the intelligent presentation device. In addition, the 5G network may include a server or a module that performs the AI processing.

FIG. 6 is a diagram for illustrating a system in which an intelligent device and an AI device are linked according to an embodiment of the present disclosure.

Referring to FIG. 6, the display device 110 may transmit data requiring the AI processing to the intelligent presentation-assisting device 120 via the communication unit. Further, the intelligent presentation-assisting device 120 including the deep learning model 16 may transmit, to a server, the result of the AI processing using the deep learning model 16. The intelligent presentation-assisting device 120 may refer to the content described in FIG. 5.

The display device 110 may include a memory 111b, a processor 111a, and a power supply 111c. Further, the processor 111a may further include an AI processor 111e.

The memory 111b is electrically connected to the processor 111a. The memory 111b may store basic data for the display device 110, control data for controlling an operation of the display device 110, and data inputted or outputted. The memory 111b may store data processed by the processor 111a. The memory 111b may be configured in hardware as at least one of a ROM, a RAM, an EPROM, a flash drive, and a hard drive. The memory 111b may store various data for an overall operation in the intelligent presentation method, such as a program for processing or controlling of the processor 111a. The memory 111b may be integrated with the processor 111a. According to an embodiment, the memory 111b may be classified into a lower configuration of the processor 111a.

The power supply 111c may supply power to the display device 110. The power supply 111c may receive power from a power source (e.g., a battery) included in the display device 110 and supply the received power to each unit of the display device 110. The power supply 111c may be operated based on a control signal provided from a main ECU 240. The power supply 111c may include a switched-mode power supply (SMPS).

The processor 111a may be electrically connected to the memory 111b, an interface unit (not shown), and the power supply 111c to exchange signals with each other. The processor 111a may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and electrical units for performing other functions.

The processor 111a may be driven by the power provided from the power supply 111c. The processor 111a may receive data, process the data, generate a signal, and provide the signal while the power is supplied by the power supply 111c.

The processor 111a may receive information another electronic device in the display device 110.

The display device 110 may include at least one printed circuit board (PCB). The memory 111b, the power supply 111c, and the processor 111a may be electrically connected to the printed circuit board.

Hereinafter, in the intelligent presentation device 100 of the present disclosure, the AI processor 111e mounted on at least one of the intelligent presentation-assisting device 120 or the display device 110 will be described in more detail.

In one example, the intelligent presentation-assisting device 120 may transmit information about the command voice of the presenter to the display device 110 via the communication unit 111d. The intelligent presentation-assisting device 120 may transmit AI processing data generated by applying the neural network model 16 to the transmitted data to the display device 110.

That is, the intelligent presentation device 100 may learn the presentation content of the presenter based on the AI processing data, detect the command voice of the presenter or a command voice of a speaker from the learned presentation content, and accurately recognize the recognized command voice to rapidly provide a response to the presenter or the speaker such as data, material, or the like corresponding to the command voice.

The communication unit 111d may exchange signals with the intelligent presentation device 100 located externally. In addition, the communication unit 111d may exchange signals with at least one of an infrastructure (e.g., a server and a broadcasting station), an IoT device, and a terminal. The communication unit 111d may include at least one of a transmission antenna, a reception antenna, a radio frequency (RF) circuit capable of implementing various communication protocols, and an RF element to perform communication.

In one example, the AI processor 111e may transmit information about the command voice transmitted from the intelligent presentation device 100 to at least one of the intelligent presentation-assisting device 120 or the display device 110.

According to an embodiment of the present disclosure, the communication unit 111d may acquire a wake up voice or the command voice among the learned presentation content. The communication unit 111d may deliver the obtained wake up voice or command voice to the processor 111a.

According to an embodiment of the present disclosure, the processor 111a may extract or predict data or information necessary for the presentation content intended by the presenter or the speaker using the command voice transmitted from the communication unit 111d. The processor 111a may be controlled to select an appropriate response among various responses corresponding to the command voice based on the learned presentation conference and provide the selected appropriate response to the display device that is displaying the presentation content to display the selected appropriate response.

Hereinabove, referring to FIGS. 1 to 6, content of the 5G communication necessary for implementing the intelligent presentation device according to an embodiment of the present disclosure, the AI processing by applying the 5G communication, and transmission and reception of the AI processing result was described.

Figure 7:
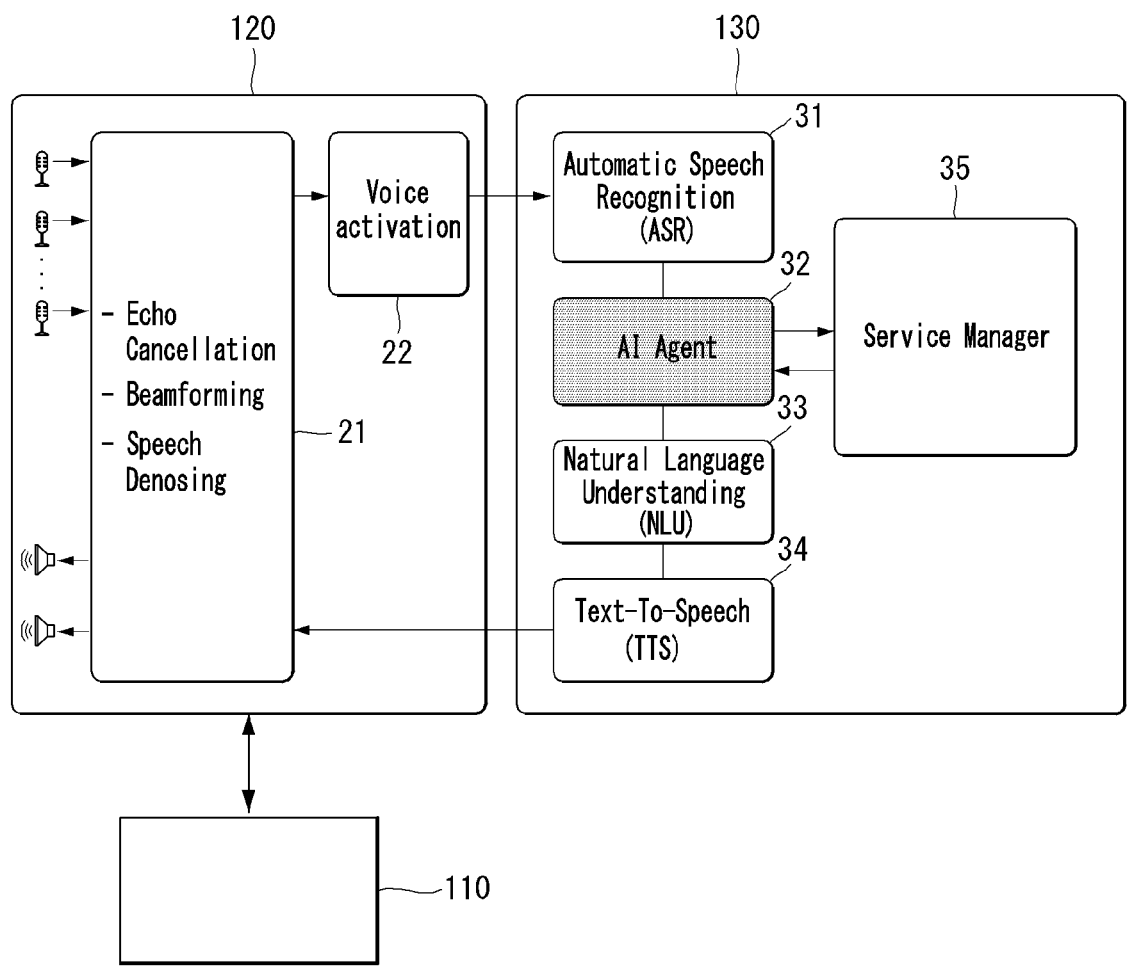
FIG. 7 illustrates an example in which a voice is processed between an intelligent presentation-assisting device and a server according to an embodiment of the present disclosure, but an overall operation of the voice processing is performed in the server.

Hereinafter, according to an embodiment of the present disclosure, FIGS. 7 and 8 may describe a process of processing a voice of a presentation of a presenter by the intelligent presentation-assisting device. FIG. 7 illustrates an example in which a voice is processed between the intelligent presentation-assisting device 120 and the server 130 according to an embodiment of the present disclosure, but an overall operation of the voice processing is performed in the server 130. For example, the server 130 may be referred to as a cloud.

Figure 8:
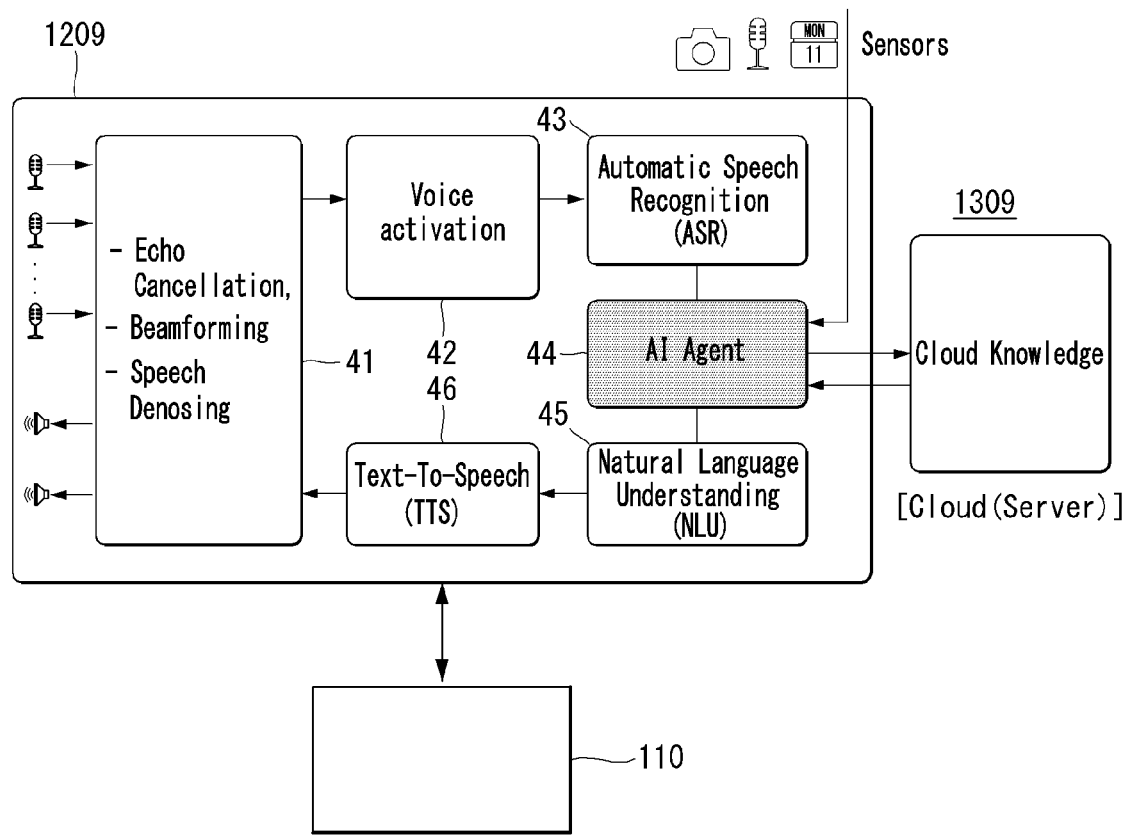
FIG. 8 illustrates a schematic block diagram of an intelligent presentation-assisting device and a server according to an embodiment of the present disclosure.

In contrast, FIG. 8 illustrates an example of on-device processing in which a voice is processed between the intelligent presentation-assisting device 120 and the server 130 according to an embodiment of the present disclosure, but an overall operation of the voice processing is performed in the intelligent presentation-assisting device 120.

FIG. 7 illustrates a schematic block diagram of an intelligent presentation-assisting device and a server in an intelligent presentation device according to an embodiment of the present disclosure.

FIG. 7 illustrates a schematic block diagram of the intelligent presentation-assisting device 120 and the server 130 in the video conference system 100 using the artificial intelligence according to an embodiment of the present disclosure.

As shown in FIG. 7, the intelligent presentation-assisting device 120 of the present disclosure may require various components to process a voice event in an end-to-end voice UI environment.

A sequence that processes the voice event may perform signal acquisition and playback, speech pre-processing, voice activation, speech recognition, natural language processing, and speech synthesis, which is a final response of the device to the user.

The intelligent presentation-assisting device 120 may include an input module. The input module may receive user input from the user. The input module may be referred to as an input unit. For example, the input module may include at least one microphone (MIC) capable of receiving a user's speech as a voice signal. The input module may include a speech input system. The input module may receive the user's speech as the voice signal via the speech input system. The at least one microphone may generate an input signal for an audio input, thereby determining a digital input signal for the user's speech.

According to one embodiment, a plurality of microphones may be implemented in an array. The array may be arranged in a geometric pattern, for example, a linear geometric form, a circular geometric form, or in any other configuration. For example, an array of four sensors may be arranged in a circular pattern for a predetermined point, in which the four sensors are separated from each other by 90 degrees to receive sounds from four directions. In some implementations, the microphone may include spatially different arrays of sensors in data communication, which may be networked arrays of sensors. The microphone may include an omnidirectional microphone, a directional microphone (e.g., a shotgun microphone), and the like.

The intelligent presentation-assisting device 120 may include a pre-processing module 21 capable of pre-processing a user input (voice signal) received through the input module (e.g., the microphone).

The pre-processing module 21 may include an adaptive echo canceller (AEC) function to remove echo included in the user voice signal input via the microphone. The pre-processing module 21 includes a noise suppression (NS) function to remove a background noise included in the user input. The pre-processing module 21 may include an end-point detect (EPD) function to detect an end-point of the user's voice to find a portion where the user's voice exists. In addition, the pre-processing module 21 includes an automatic gain control (AGC) function, so that a volume of the user input may be adjusted to be suitable for recognizing and processing the user input.

The intelligent presentation-assisting device 120 may include a voice activation module 22. The voice activation module 22 may recognize a wake up command that recognizes a user's call. The wake up command may be referred to as a wake up voice. The voice activation module 22 may detect or sense a predetermined keyword (e.g., Hi LG) from the user input that has been pre-processed. The voice activation module 22 may be in a standby state to perform an always-on keyword detection function.

The intelligent presentation-assisting device 120 may transmit the user voice input to the server 130. Auto speech recognition (ASR) and natural language understanding (NLU) operations, which are key operations for processing the user voice, may be performed in the server 130 in consideration of computing, storage, power constraints, and the like. The server 130 may process the user input transmitted from the intelligent presentation-assisting device 120. The server 130 may exist in a cloud form.

The server 130 may include an auto speech recognition (ASR) module 31, an artificial intelligent agent 32, a natural language understanding (NLU) module 33, a text-to-speech (TTS) module 34, and a service manager 35.

The ASR module 31 may convert the user voice input received from the intelligent presentation-assisting device 120 into text data.

The ASR module 31 may include a front-end speech pre-processor. The front-end speech pre-processor may extract representative features from the speech input. For example, the front-end speech pre-processor may perform Fourier transform on the speech input to extract a spectral feature that characterizes the speech input as a representative multi-dimensional vector sequence.

In addition, the ASR module 31 may include at least one speech recognition model (e.g., acoustic model and/or language model) and may implement at least one speech recognition engine. For example, the speech recognition model may include a hidden Markov model, a Gaussian-Mixture Model, a Deep Neural Network Model, an n-gram language model, and other statistical models. Examples of the speech recognition engine may include a dynamic time distortion-based engine and a weighted finite-state transducer (WFST)-based engine. At least one speech recognition model and at least one speech recognition engine may be used to process the extracted representative features of the front-end speech pre-processor in order to generate intermediate recognition results (e.g., phonemes, phoneme strings, and sub-words) and ultimately text recognition results (e.g., words, word strings, or sequences of tokens).

The ASR module 31 may generate recognition results that include a text string (e.g., words, or a sequence of words, or a sequence of tokens). The recognition results may be delivered to the natural language processing module 33 for intent inference under control of the ASR module 31. For example, the ASR module 31 may generate a number of candidate textual representations of the speech input. Each candidate textual representation may be the sequence of the words or the tokens corresponding to the speech input.

The natural language processing (NLU) module 33 may perform syntactic analysis or semantic analysis to determine user intent. The NLU module 33 may be referred to as a natural language understanding module. The syntactic analysis may divide grammatical units (e.g., words, phrases, morphemes, or the like) and identify what grammatical elements the divided unit has. The semantic analysis may be performed using semantic matching, rule matching, formula matching, and the like. Accordingly, the NLU module 33 may obtain a domain, an intent, or a parameter required for the user input to represent the intent.

The NLU module 33 may determine the intent of the user and the parameter using mapping rules divided into the domain, intent, and parameter required for determining the intent. For example, one domain (e.g., alarm) may include a plurality of intents (e.g., alarm setting, alarm cancellation) and one intent may include a plurality of parameters (e.g., time, the number of repetitions, alarm sound, or the like). For example, a plurality of rules may include at least one essential element parameter. Matching rules may be stored in a natural language understanding database.

The NLU module 33 may identify a meaning of a word extracted from the user input using linguistic features (e.g., grammatical elements) such as a morpheme, a phrase, or the like and match the identified meaning of the word to the domain and the intent to determine the intent of the user. For example, the NLU module 33 may learn how many words extracted from the user input are included in each domain and intent and determine the user intent.

According to one embodiment, the NLU module 33 may determine the parameter of the user input using the words on which the intent determination is based. According to one embodiment, the NLU module 33 may determine the intent of the user using the natural language recognition database in which the linguistic features for determining the intent of the user input are stored.

In addition, according to one embodiment, the NLU module 33 may determine the user intent using a personal language model (PLM). For example, the NLU module 33 may use personalized information to determine the user intent. For example, the personalized information may include a contact list, a music list, schedule information, social network information, and the like. For example, the personal language model may be stored in the natural language recognition database. According to an embodiment, not only the NLU module 33 but also the ASR module 31 may recognize the user voice by referring to the personal language model stored in the natural language recognition database.

The NLU module 33 may further include a natural language generating module (not shown). The natural language generating module may change designated information into a text form. The information changed into the text form may be in a form of natural language speech. For example, the designated information may include information about additional input, information for guiding completion of an operation corresponding to the user input, information for guiding the additional input of the user, and the like. The information changed into the text form may be transmitted to the display device via the intelligent presentation-assisting device 120 and displayed on the display, or may be transmitted to the TTS module and changed into a voice form. The TTS module 34 may change the information in the text form into information in a voice form.

The TTS module 34 may receive the information in the text form from the natural language generating module of the NLU module 33, change the information in the text form into the information in the voice form, transmit the information in the voice form to the intelligent presentation-assisting device 120 or to the display device. The intelligent presentation-assisting device 120 or the display device may output the information in the voice form via the speaker.

The TTS module 34 may synthesize speech output based on a provided text. For example, the result generated by the auto speech recognition (ASR) module 21 may be in a form of a text string. The TTS module 34 may convert the text string into audible speech output. The TTS module 34 uses any suitable speech synthesis technique to generate the speech output from the text. The TTS module 34 may include concatenative synthesis, unit selection synthesis, diphone synthesis, domain-specific synthesis, formant synthesis, articulatory synthesis, hidden Markov model (HMM)-based synthesis, and sinewave synthesis, but is not limited thereto.

In some examples, the TTS module 34 may be configured to synthesize individual words based on a phoneme string corresponding to the words. For example, the phoneme string may be associated with a word of the generated text string. The phoneme string may be stored in metadata associated with the word. The TTS module 34 may be configured to directly process the phoneme string in the metadata to synthesize words in a speech form.

Since the server 130 generally has more processing power or resources than the intelligent presentation-assisting device 120, the server 130 may obtain a speech output of a higher quality than the actual one in synthesis at the intelligent presentation-assisting device 120. However, the present disclosure is not limited thereto, and in fact, the speech synthesis process may be performed at the intelligent presentation-assisting device 120.

In one example, according to one embodiment of the present disclosure, the server 130 may further include the artificial intelligent agent 32. The artificial intelligent agent 32 may be referred to as an AI agent. The artificial intelligent agent 32 may be designed to perform at least some of the functions performed by the ASR module 31, the NLU module 22, and/or the TTS module 34 described above. Further, the artificial intelligent agent module 22 may also contribute to performing independent functions of each of the ASR module 31, the NLU module 22, and/or the TTS module 34.

The artificial intelligent agent module 22 may perform the above-described functions via deep learning. A lot of research on the deep learning (research on how to create better representation techniques and how to build models to learn the better representation techniques) is being carried out to represent data in a form that may be understood by a computer (e.g., representing pixel information as a column vector in case of an image) and apply the data in learning. As a result of these efforts, the various deep learning technologies such as the DNNs (deep neural networks), the CNNs (convolutional deep neural networks), the RNN (Recurrent Boltzmann Machine), the RBM (Restricted Boltzmann Machine), the DBNs (deep belief networks), and the deep Q-Network may be applied to the fields such as the computer vision, the voice recognition, the natural language processing, and the voice/signal processing.

Currently, all major commercial speech recognition systems (MS Cortana, Skype Translator, Google Now, Apple Siri, or the like) are based on the deep learning techniques.

In particular, the artificial intelligent agent module 22 may perform various natural language processing processes, including machine translation, emotion analysis, and information retrieval, using a deep artificial neural network structure in the natural language processing field.

In an example, the server 130 may include the service manager 35 that may support the function of the artificial intelligent agent 32 by collecting various personalized information. The personalized information obtained via the service manager 35 may include at least one data (such as usage of a calendar application, a messaging service, a music application, or the like) used by the intelligent presentation-assisting device 120 via the server 130, at least one sensing data collected by the intelligent presentation-assisting device 120 and/or the server 130 (a camera, a microphone, a temperature sensor, a humidity sensor, a gyro sensor, a C-V2X, a pulse, ambient light, Iris scan, or the like), and off device data, which is not directly related to the intelligent presentation-assisting device 120. For example, the personalized information may include maps, SMS, News, music, stock, weather, wikipedia information.

The artificial intelligent agent 32 is represented as a separate block to be distinguished from the ASR module 31, the NLU module 33, and the TTS module 34 for convenience of description, but the artificial intelligent agent 32 may perform at least some or all of the functions of each module 31, 32, and 34.

The intelligent presentation-assisting device 120 or the server 130 described above may be electrically connected to the display device 111. The display device 111 may display data or information received from the intelligent presentation-assisting device 120 or the server 130.

Hereinabove, the example in which the artificial intelligent agent 32 is implemented on the server 130 due to computing operation, storage, power constraint, or the like, but is not limited thereto.

For example, FIG. 8 may be the same as shown in FIG. 7 except a case in which the artificial intelligent agent (AI agent) is included in the intelligent conference-assisting device.

FIG. 8 illustrates a schematic block diagram of an intelligent presentation-assisting device 1209 and a server 1309 according to another embodiment of the present disclosure.

The intelligent conference-assisting device and the server shown in FIG. 8 has some differences in configuration and functions thereof but may correspond to the intelligent conference-assisting device and the server referred in FIG. 7. Accordingly, a specific function of a corresponding block may be referred to FIG. 7.

Referring to FIG. 8, the intelligent conference-assisting device may include a pre-processing module 41, a voice activation module 42, an ASR module 43, an artificial intelligent agent 44, an NLU module 45, and a TTS module 46. In addition, the intelligent conference-assisting device may include an input module (at least one microphone) and at least one output module.

In addition, the server 1309 may include cloud knowledge for storing information related to the conference content in a form of knowledge.

Functions of each module shown in FIG. 8 may refer to FIG. 7. However, since the ASR module 43, the NLU module 45, and the TTS module 46 are included in the intelligent presentation-assisting device 1209, communication with the cloud 115 may not be required for the voice processing such as the speech recognition and the speech synthesis, thereby enabling immediate and real-time voice processing.

Each module illustrated in FIGS. 7 and 8 is merely an example for describing the voice processing process, and more or fewer modules than those illustrated in FIGS. 7 and 8 may be included. It should also be noted that at least two modules may be combined with each other or different modules or modules of different arrangements may be included.

The various modules illustrated in FIGS. 7 and 8 may be implemented in at least one signal processing and/or custom integrated circuit, hardware, software instructions for execution by at least one processor, firmware, or combinations thereof.

The intelligent presentation-assisting device 1209 or the server 1309 described above may be electrically connected to the display device 111. The display device 111 may display the data or information received from the intelligent presentation-assisting device 1209 or the server 1309.

Figure 9:
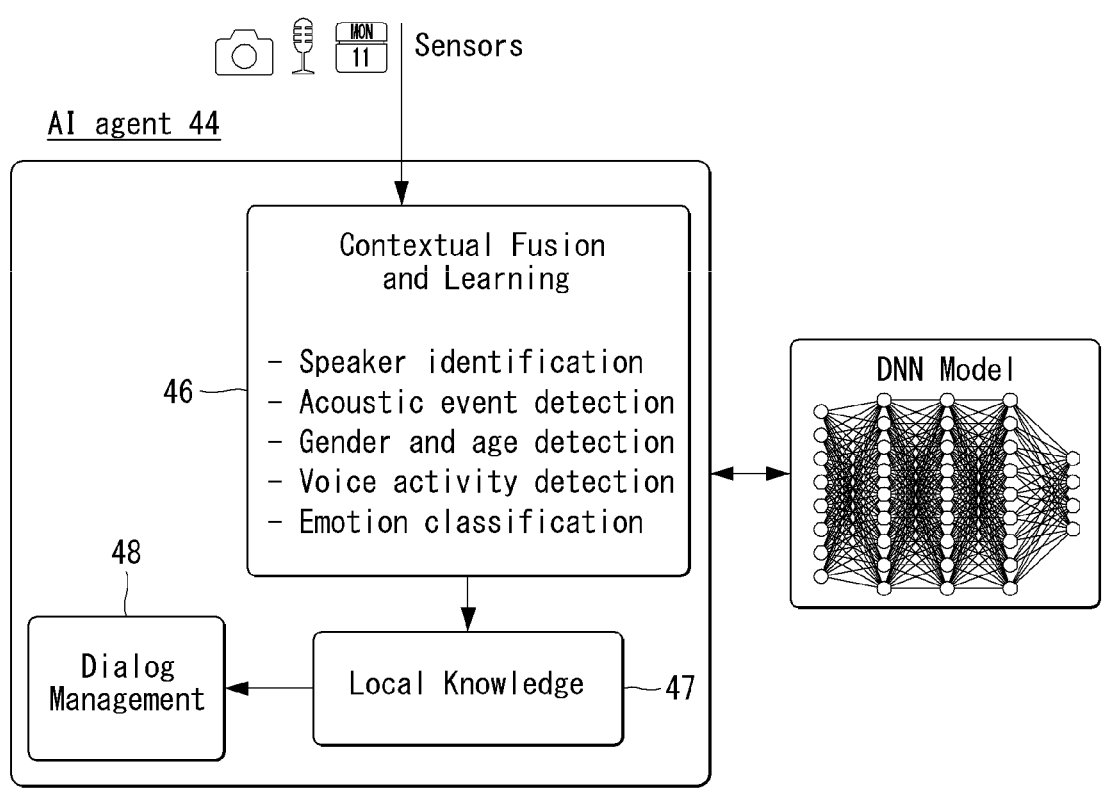
FIG. 9 illustrates a schematic block diagram of an artificial intelligent agent that may implement speech synthesis according to an embodiment of the present disclosure.
Figure 10:
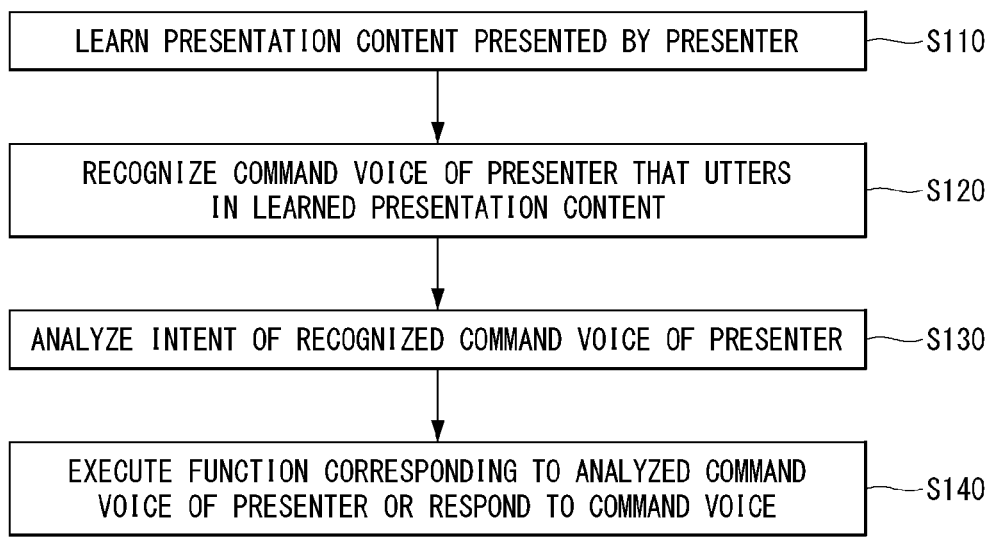
FIGS. 10 to 14 are flowcharts for illustrating an intelligent presentation method according to an embodiment of the present disclosure.
Figure 11:
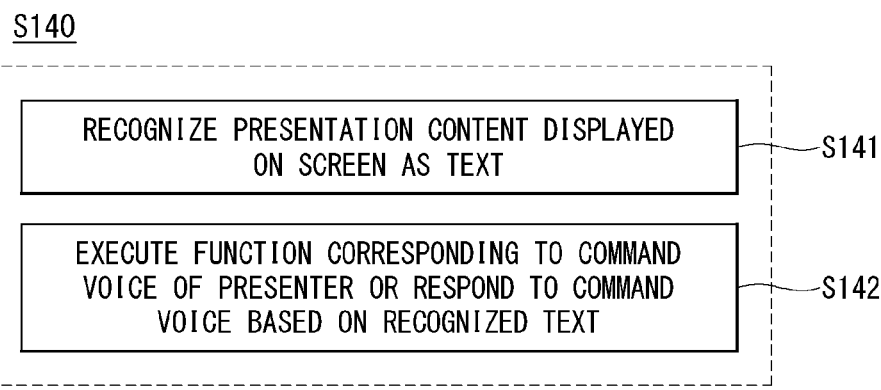
Figure 12:
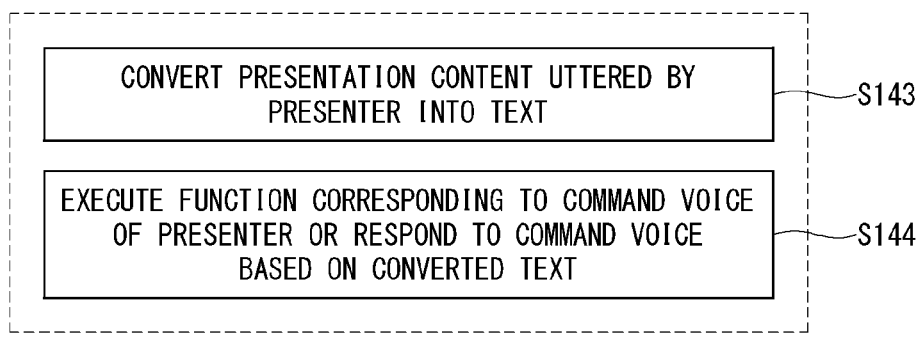
Figure 13:
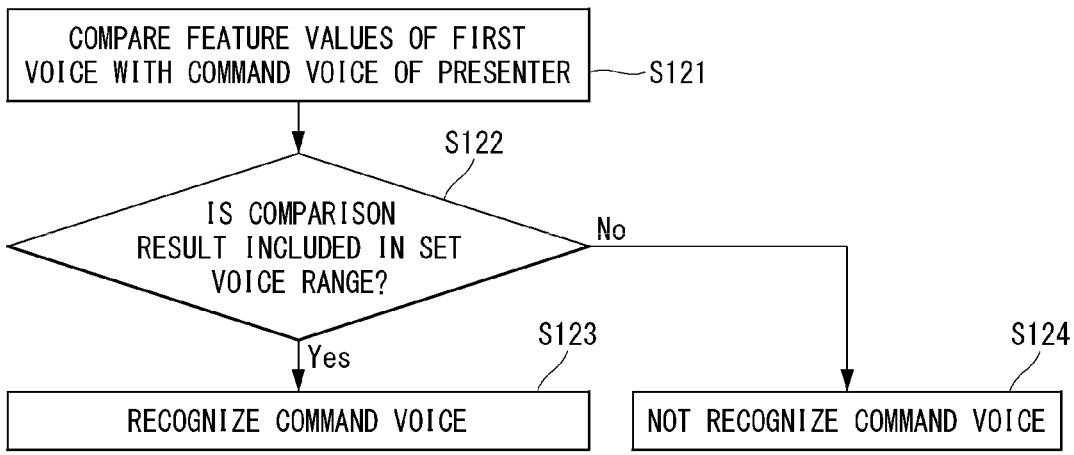
Figure 14:
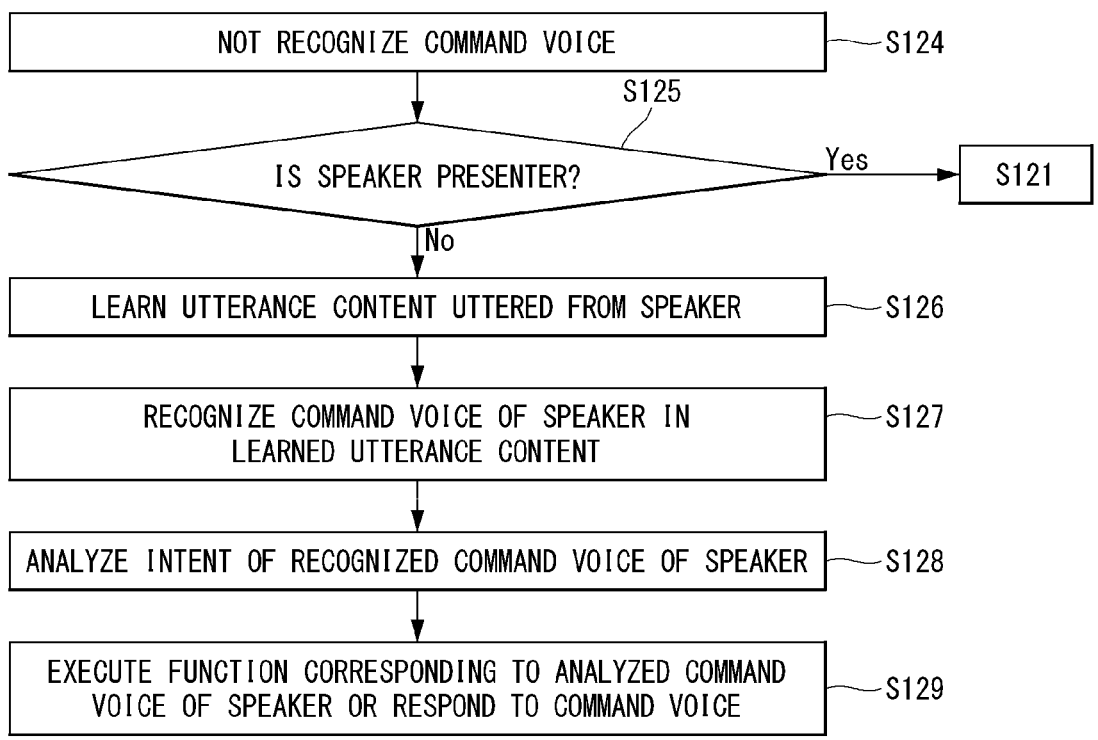

FIG. 9 illustrates a schematic block diagram of an artificial intelligent agent that may implement speech synthesis according to an embodiment of the present disclosure.

Referring to FIG. 9, the artificial intelligent agent 44 may support an interactive operation with the user in addition to performing the ASR operation, the NLU operation, and the TTS operation in the voice processing described with reference to FIGS. 7 and 8. Alternatively, the artificial intelligent agent 44 may use context information to contribute performing an operation of the NLU module 45 to clarify, supplement, or additionally define information included in the text representations received from the ASR module 43.

For example, the context information may include preferences of the users using the intelligent conference-assisting devices 112 and 114 (see FIGS. 7 and 8), hardware and/or software states of the intelligent conference-assisting devices 112 and 114 (see FIGS. 7 and 8), various sensor information collected before, during, or immediately after the user input, previous interactions between the artificial intelligent agent 44 and the user (e.g., conversations), and the like. The context information described above is dynamic and may include features that may vary depending on time, location, content of conversation, and other elements.

The artificial intelligent agent 44 may further include a contextual fusion and learning module 46, a local knowledge 47, and a dialog management 48.

The contextual fusion and learning module 46 may learn the user's intent based on at least one data. The at least one data may include at least one sensing data obtained from the intelligent conference-assisting devices 112 and 114 (see FIGS. 7 and 8) or the servers 113 and 115 (see FIGS. 7 and 8). In addition, the at least one data may include speaker identification, acoustic event detection, video conference content, voice activity detection (VAD), and emotion classification.

The speaker identification may mean specifying a person speaking in a conversation group registered by a voice. The speaker identification may include processes of identifying a registered speaker or registering the speaker as a new speaker.

The acoustic event detection may recognize a sound itself beyond the speech recognition technology to recognize a type of sound and an occurrence location of the sound.

The voice activity detection (VAD) is a speech processing technique in which a presence or absence of human speech (voice) is detected in an audio signal that may include music, noise, or other sound. According to an example, the artificial intelligent agent 44 may identify the presence of the speech from the input audio signal. According to an example, the artificial intelligent agent 44 may distinguish the speech data and the non-speech data using the deep neural network (DNN) model.

In addition, the artificial intelligent agent 44 may use the deep neural network (DNN) model to analyze the speech data, extract core data from the analyzed speech data, and perform, based on the extracted core data or material, a search associated therewith.

The contextual fusion and learning module 46 may include the DNN model to perform the above-described operation. Further, the contextual fusion and learning module 46 may identify the intent of the user input based on the sensing information collected from the DNN model, client, or servers 113 and 115 (see FIGS. 7 and 8).

The at least one data is merely exemplary and may include any data that may be referred to identify the user's intent in the speech processing. The at least one data may be obtained via the above-described DNN model.

The artificial intelligent agent 44 may include a local knowledge 47. The local knowledge 47 may include presentation data about the presentation content. The presentation data may include agenda or subject of the presentation content, key words, surrounding word, set language, command voice, or the like related to the presentation content. According to an example, the artificial intelligent agent 44 may additionally define the intent of the presenter by supplementing information included in a voice input of the presenter using specific information related to the command voice and the presentation content. For example, in response to a presenter request, "Please show a graph of sales figures of companies that manufactured smartphones in 2018.", the artificial intelligent agent 24 may not require the presenter to provide more clear information in order to search for "manufacturers of smartphones" and "sales figure" of each company, and use the local knowledge 47.

The artificial intelligent agent 44 may include a dialog management 48. The artificial intelligent agent 44 may provide a dialog interface to enable voice conversation with the presenter. The dialog interface may refer to a process of outputting a response to the presenter's voice input via the display or the speaker. In this connection, a final result output through the dialog interface may be based on the above-described ASR operation, NLU operation, and TTS operation.

FIGS. 10 to 14 are flowcharts for illustrating an intelligent presentation method according to an embodiment of the present disclosure.

Referring to FIGS. 10 to 14, the intelligent presentation method of the present disclosure may include learning the presentation content presented by the presenter (S110), recognizing the command voice of the presenter that utters in the learned presentation content (S120), analyzing the intent of the recognized command voice of the presenter (S130), and executing a function corresponding to the analyzed command voice of the presenter or responding to the command voice (S140).

The intelligent presentation method may further include recognizing the presentation content displayed on a screen as text (S141) and executing the function corresponding to the command voice of the presenter or responding to the command voice based on the recognized text (S142). The intelligent presentation-assisting device 120 may recognize a graph or a picture of the presentation content displayed on the display device 110 as text and execute the function corresponding to the command voice of the presenter or respond to the command voice based on the recognized text.

The intelligent presentation method may further include converting the presentation content uttered by the presenter into a text (S143), and executing the function corresponding to the command voice of the presenter or responding to the command voice based on the converted text (S144). The intelligent presentation-assisting device 120 may detect the presentation content uttered by the presenter in real time and convert the detected utterance content into a text in real time. The intelligent presentation-assisting device 120 may execute the function corresponding to the command voice of the presenter or respond to the command voice based on the converted text.

In the intelligent presentation method of the present disclosure, the learning of the presentation content (S110) may include acquiring first voice data uttered by the presenter and extracting and learning feature values of a first voice from the acquired first voice data.

The recognizing of the command voice of the presenter (S120) may include comparing the learned feature values of the first voice with the command voice of the presenter (S121), and when the comparison result is included in a set voice range (S122), recognizing the command voice of the presenter (S123).

The recognizing of the command voice of the presenter (S120) may include comparing the learned feature values of the first voice with the command voice of the presenter (S121), and when the comparison result is not included in a set voice range (S122), not recognizing the command voice of the presenter (S124).

The intelligent presentation method may further include, when the command voice of the presenter is not recognized (S124), determining the presenter as the speaker (S125) and learning utterance content uttered from the speaker (S126).

The learning of the utterance content uttered by the speaker (S126) may include acquiring second voice data uttered by the speaker and extracting and learning feature values of a second voice from the acquired second voice data (S126).

The intelligent presentation method may include recognizing a command voice of the speaker in the learned utterance content (S127), analyzing an intent of the recognized command voice of the speaker (S128), and executing a function corresponding to the analyzed command voice of the speaker or responding to the command voice (S129).

The recognizing of the command voice of the speaker (S127) may include comparing the learned feature values of the second voice with the command voice of the speaker, and when the comparison result is included in a set voice range, recognizing the command voice of the speaker.

A command voice of the presenter related to a situation in which the presenter utters may be obtained, the command voice of the presenter may be applied to a pre-trained command voice recognition, determination, and classification model, whether the situation in which the command voice of the presenter is recognized is correct may be determined based on the application result, and an intent of the command voice of the presenter may be analyzed based on the determination result.

Figure 15:
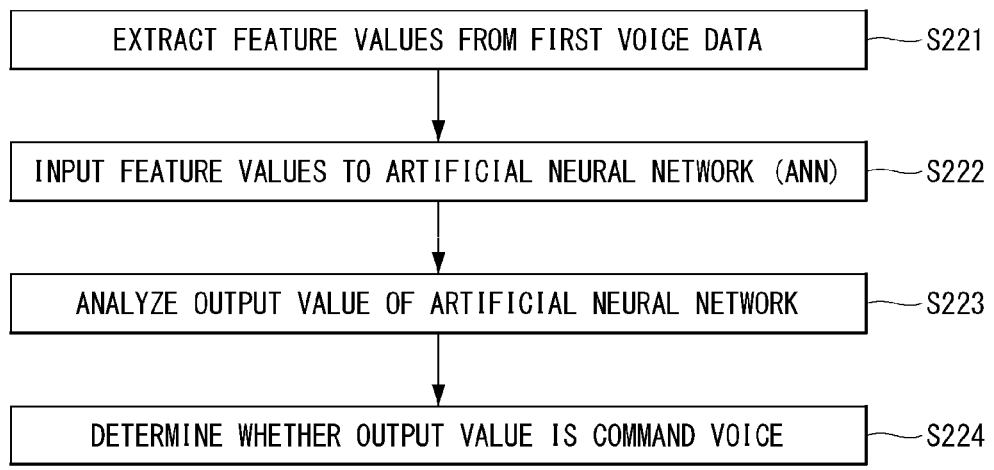
FIG. 15 illustrates a flowchart of an intelligent presentation method according to an embodiment of the present disclosure.

FIG. 15 illustrates a flowchart of an intelligent presentation method according to an embodiment of the present disclosure.

Referring to FIG. 15, the intelligent presentation-assisting device may extract feature values from first voice data of the presenter obtained via at least one sensor in order to analyze or recognize the presentation content of the presenter (S221).

For example, the intelligent presentation-assisting device may receive the first voice data or first voice information from the at least one sensor (e.g., microphone). The intelligent presentation-assisting device may extract the feature values from the first voice data or the first voice information. The feature values, which specifically indicate the presentation content of the presenter, are calculated from at least one feature that may be extracted from the first voice data or the first voice information.

The intelligent presentation-assisting device may control the feature values to be input to an artificial neural network (ANN) classifier trained to distinguish the command voice from the presentation content (S222).

The intelligent presentation-assisting device may combine the extracted feature values with each other to generate a command voice recognition state. The command voice recognition state may be input to the artificial neural network (ANN) classifier trained to distinguish the command voice from the presentation content based on the extracted feature values. The artificial neural network classifier may be referred to as a recognition, determination, and classification model.

The intelligent presentation-assisting device may analyze output value of the artificial neural network (S820), and determine a command voice state based on the output value of the artificial neural network (S223).

The intelligent presentation-assisting device may determine whether the feature values are the command voice related to the presentation content from the output of the artificial neural network classifier.

In one example, in FIG. 15, an example in which the operation of identifying the command voice through the AI processing is implemented in the processing of the intelligent presentation device is described, but the present disclosure is not limited thereto. For example, the AI processing may be performed on a 5G network based on sensing information received from the intelligent presentation device.

Figure 16:
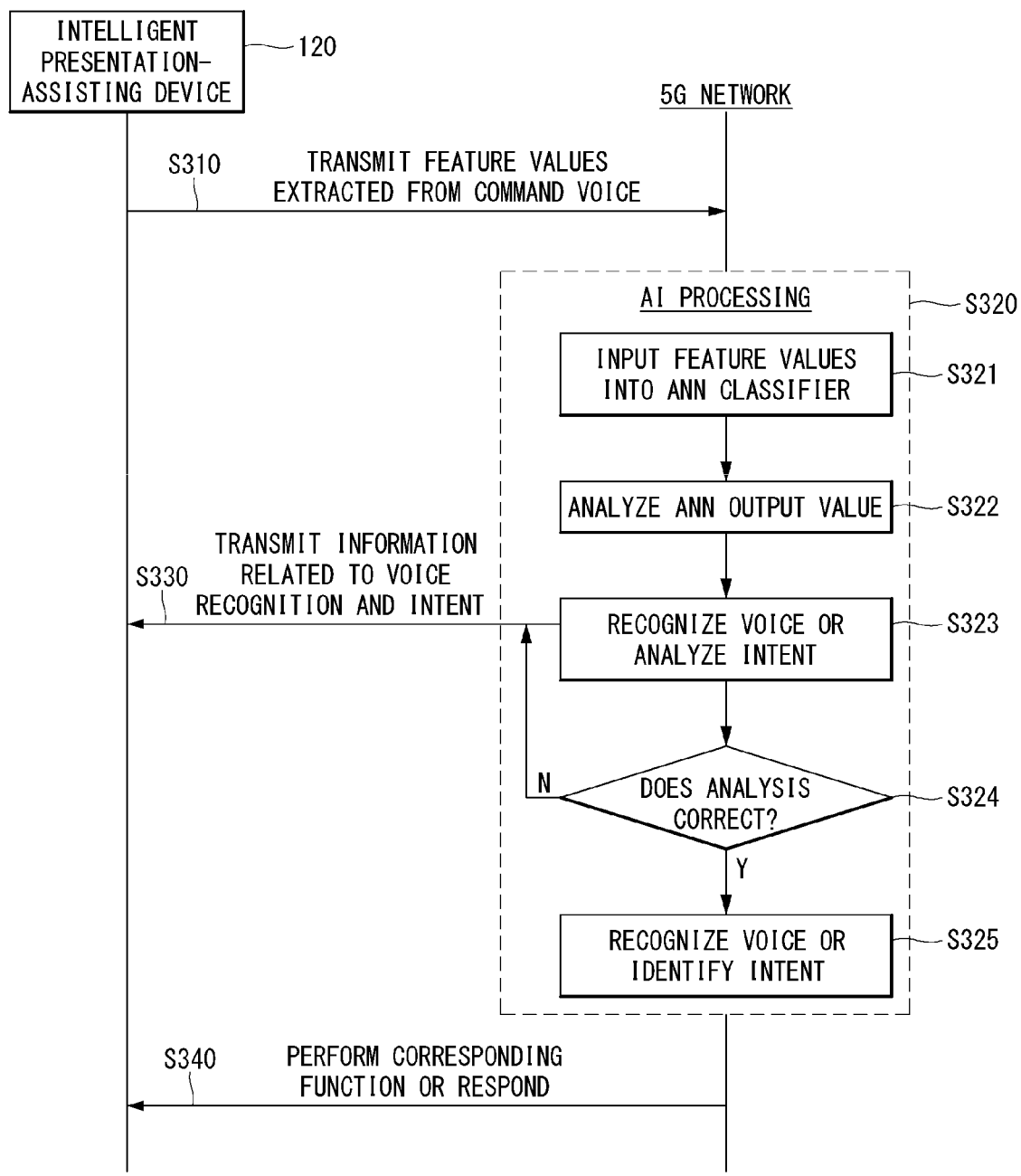
FIG. 16 illustrates a flowchart of an intelligent presentation method according to another embodiment of the present disclosure.

FIG. 16 illustrates a flowchart of an intelligent presentation method according to another embodiment of the present disclosure.

Referring to FIG. 16, the intelligent presentation-assisting device may include learn the presentation content presented by the presenter, recognize the command voice of the presenter that utters in the learned presentation content, analyze the intent of the recognized command voice of the presenter, and execute the function corresponding to the analyzed command voice of the presenter or respond to the command voice.

That is, the intelligent presentation-assisting device may be controlled to obtain the command voice of the presenter related to the situation in which the presenter utters, apply the command voice of the presenter to the pre-trained command voice recognition, determination, and classification model, determine whether the situation in which the command voice of the presenter is recognized is correct based on the application result, and analyze the intent of the command voice of the presenter based on the determination result.

The command voice recognition, determination, and classification model is stored in an external artificial intelligence (AI) device. Further, the command voice recognition, determination, and classification model may transmit, to the external AI device, feature values related to information related to the situation in which the command voice of the presenter is recognized, and obtain, from the external AI device, the result of applying the command voice of the presenter to the command voice recognition, determination, and classification model.

The command voice recognition, determination, and classification model is stored in the 5G network. Further, the command voice recognition, determination, and classification model may transmit, to the 5G network, information related to the situation in which the command voice of the presenter is recognized, and receive, from the 5G network, the result of applying the command voice of the presenter to the command voice recognition, determination, and classification model.

Receiving, from the 5G network, downlink control information (DCI) used to schedule transmission of the information related to the situation in which the command voice of the presenter is recognized may be further included. Further, the information related to the situation in which the command voice of the presenter is recognized may be transmitted to the 5G network based on the DCI.

Performing an initial access procedure to the 5G network based on a synchronization signal block (SSB) may be further included. Further, the information related to the situation in which the command voice of the presenter is recognized may be transmitted to the 5G network through a physical uplink shared channel (PUSCH). Further, a demodulation-reference signal (DM-RS) of the SSB and the PUSCH may be QCLed (quasi co-located) for a QCL type D.

Controlling a communication unit to transmit the information related to the situation in which the command voice of the presenter is recognized to an AI processor included in the 5G network and controlling the communication unit to receive AI processed information from the AI processor may be further included. Further, the AI processed information may be information determined whether the command voice of the presenter is recognized.

Thereafter, the intelligent presentation-assisting device may execute the function corresponding to the command voice of the presenter and respond to the command voice.

Referring to FIG. 16, the intelligent presentation-assisting device may transmit the feature values extracted from the command voice to the 5G network (S310).

In this connection, the 5G network may include the AI processor or an AI system, and the AI system of the 5G network may perform the AI processing based on the received command voice (S320). The command voice may include information of the command voice.

The AI system may input the feature values received from the intelligent presentation-assisting device into the ANN classifier (S321). The AI system may analyze the ANN output value (S322), and determine the state of the command voice from the ANN output value (S323). The 5G network may transmit the state information of the command voice determined by the AI system to the intelligent presentation-assisting device via a wireless communication unit (S330).

In this connection, the state information of the command voice may be information on whether the voice of the presenter is properly recognized and an analysis on an intent thereof is correct.

When the analysis on the command voice is determined to be correct (S324), the AI system may recognize the voice and identify the intent thereof and execute a function corresponding to the command voice of the presenter or respond corresponding to the command voice.

When the analysis on the command voice is determined to be incorrect, the AI system may recognize the voice and identify the intent thereof again.

In one example, the intelligent presentation-assisting device may transmit only voice information or command voice to the 5G network and extract the feature values corresponding to the voice recognition of the presenter or the intent thereof to be used as an input of the artificial neural network in order to recognize the voice of the presenter and identify the intent thereof from the voice information or command voice in the AI system included in the 5G network.

Figure 17:
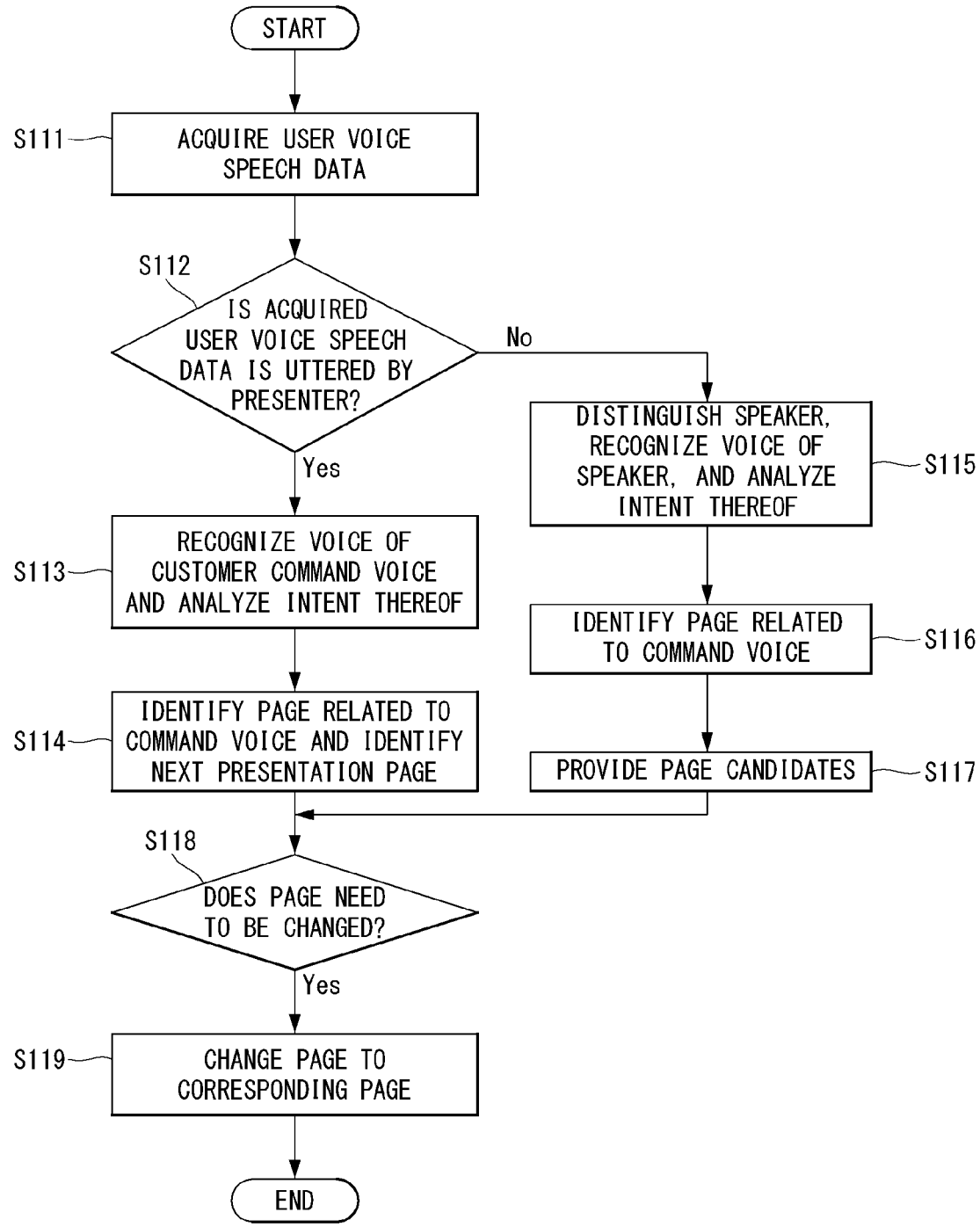
FIG. 17 illustrates an example of a presentation using an intelligent presentation device according to an embodiment of the present disclosure.

FIG. 17 illustrates an example of a presentation using an intelligent presentation device according to an embodiment of the present disclosure.

Referring to FIG. 17, the presenter may give a presentation while displaying the presentation content to be presented on the display device.

While the presenter presents the presentation content, the intelligent presentation-assisting device may acquire the first voice data of the presenter that utters. That is, the intelligent presentation-assisting device may acquire user voice speech data.

The intelligent presentation-assisting device may determine whether the acquired first voice data is uttered by the presenter (S112).

When it is determined that the acquired first voice data is a voice uttered by the presenter (S112), the intelligent presentation-assisting device may detect the command voice of the presenter from the presentation content. When the command voice is detected, the intelligent presentation-assisting device may recognize a voice of the detected command voice and analyze an intent thereof (S113).

The intelligent presentation-assisting device may identify a page being presented and a next presentation page from the command voice detected in relation to the presentation content. The presentation page may be referred to as an explanation page.

The intelligent presentation-assisting device may determine whether to change a page in response to the command voice (S118). For example, the intelligent presentation-assisting device may not change the page when the current page is related to content being presented or explained. In contrast, when the current page is not related to the content being presented or explained, the intelligent presentation-assisting device may search for related content and change the page to a corresponding page (S119).

When it is determined that the acquired first voice data is not the voice uttered by the presenter (S112), the intelligent presentation-assisting device may determine that the voice is from a speaker other than the presenter. Accordingly, the intelligent presentation-assisting device may recognize the voice of the speaker and analyze an intent thereof (S115). That is, the intelligent presentation-assisting device may detect a command voice of the speaker from the content uttered by the speaker. When the command voice of the speaker is detected, the intelligent presentation-assisting device may recognize the voice of the detected command voice and analyze an intent thereof (S115).

The intelligent presentation-assisting device may identify a page related to the detected command voice (S116). When the page related to the detected command voice is identified, the intelligent presentation-assisting device may provide page candidates corresponding thereto.

The intelligent presentation-assisting device may not change the page when there is a page related to a page currently being presented or explained among the page candidates. On the contrary, when there is no page related to the page currently being presented or explained among the page candidates, the intelligent presentation-assisting device may change the page to a page corresponding thereto (S119).

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

Effects of the intelligent presentation method according to the present disclosure are as follow.

According to the present disclosure, the presentation may be supported to be smoothly performed by learning the content of the presentation while the presenter is presenting and performing the function required for the presentation in response to the command voice.

According to the present disclosure, the function required for the presentation is performed in response to the command voice while the presenter is presenting, thereby improving a reliability for the presentation.

What is claimed is:

1. An intelligent presentation method for controlling an intelligent presentation-assisting device, the method comprising:

learning presentation content presented by a presenter;
recognizing a command voice uttered by the presenter during presentation of the presentation content;
analyzing, by an artificial intelligence (AI) processor, an intent of the presenter based on the presentation content and the command voice;
executing an operation corresponding to the command voice of the presenter based on the intent;
applying the command voice of the presenter to a pre-trained command voice recognition, determination and classification model to generate an application result;
determining whether a situation in which the command voice of the presenter is recognized correctly based on the application result to generate a determination result;
analyzing the intent of the presenter based on the determination result; and
receiving, via the 5G network, downlink control information (DCI) used to schedule transmission of information related to the situation in which the command voice of the presenter is recognized, wherein the learning the presentation content includes learning the presentation content by acquiring first voice data uttered by the presenter and extracting first feature values of a first voice from the first voice data, wherein the command voice recognition, determination and classification model is stored in a 5G network, wherein the command voice recognition, determination and classification model is configured to receive, via the 5G network, the information related to the situation in which the command voice of the presenter is recognized and transmit, via the 5G network, a result of applying the command voice of the presenter to the command voice recognition, determination and classification model, and wherein the information related to the situation in which the command voice of the presenter is recognized is transmitted via the 5G network based on the DCI.

2. The intelligent presentation method of claim 1, wherein the operation includes executing a function or responding with audio output or visual output.

3. The intelligent presentation method of claim 1, further comprising:
recognizing text displayed on a screen as the presentation content; and
executing the operation corresponding to the command voice of the presenter based on the text and the intent.

4. The intelligent presentation method of claim 1, further comprising:
converting the presentation content uttered by the presenter into text; and
executing the operation corresponding to the command voice based on the text and the intent.

5. The intelligent presentation method of claim 1, wherein the recognizing the command voice uttered by the presenter includes:
comparing the first feature values of the first voice with the command voice of the presenter to generate a first comparison result; and
when the first comparison result is included in a set voice range, recognizing the command voice uttered by the presenter.

6. The intelligent presentation method of claim 1, wherein the recognizing the command voice uttered by the presenter includes:
comparing the first feature values of the first voice with the command voice uttered by the presenter to generate a first comparison result; and
when the first comparison result is not included in a set voice range, not recognizing the command voice uttered by the presenter.

7. The intelligent presentation method of claim 6, further comprising:
determining the presenter as a speaker and learning utterance content uttered from the speaker when the command voice of the presenter is not recognized,
wherein the learning the utterance content uttered by the speaker includes learning the utterance content by acquiring second voice data uttered by the speaker and extracting second feature values of a second voice from the second voice data.

8. The intelligent presentation method of claim 7, further comprising:
recognizing a second command voice of the speaker in the utterance content;
analyzing a second intent of the speaker corresponding to the second command voice; and
executing a second operation corresponding to the second command voice of the speaker.

9. The intelligent presentation method of claim 8, wherein the recognizing the second command voice of the speaker includes:
comparing the second feature values of the second voice with the second command voice of the speaker to generate a second comparison result; and
when the second comparison result is included in a set voice range, recognizing the second voice command of the speaker.

10. The intelligent presentation method of claim 1, wherein the command voice recognition, determination and classification model is stored in an external artificial intelligence (AI) device, and
wherein the command voice recognition, determination and classification model is configured to:
receive, from the intelligent presentation-assisting device, feature values related to information related to a situation in which the command voice of the presenter is recognized; and
transmit, from the external AI device, a result of applying the command voice of the presenter to the command voice recognition, determination and classification model, to the intelligent presentation-assisting device.

11. The intelligent presentation method of claim 1, further comprising:
controlling a communication unit to transmit the information related to the situation in which the command voice of the presenter is recognized to an AI processor included in the 5G network; and
controlling the communication unit to receive AI processed information from the AI processor,
wherein the AI processed information is information indicating whether the command voice of the presenter is recognized.

12. The intelligent presentation method of claim 1, further comprising:
changing a page currently being presented to a next presentation page based on the command voice and the presentation content presented by the presenter.

13. The intelligent presentation method of claim 1, further comprising:
identifying a plurality of presentation page candidates based on the command voice and the presentation content presented by the presenter; and
providing information about the plurality of presentation page candidates to the presenter.

14. An intelligent presentation-assisting device comprising:
at least one microphone configured to receive voice input; and
a controller configured to:
learn presentation content of a presentation presented by a presenter,
recognize a command voice uttered by the presenter during presentation of the presentation content,
analyze an intent of the presenter based on the presentation content and the command voice,
execute an operation corresponding to the command voice of the presenter based on the intent,
apply the command voice of the presenter to a pre-trained command voice recognition, determine and classification model to generate an application result, determine whether a situation in which the command voice of the presenter is recognized correctly based on the application result to generate a determination result, analyze the intent of the presenter based on the determination result, and receive, via the 5G network, downlink control information (DC) used to schedule transmission of information related to the situation in which the command voice of the presenter is recognized, wherein the learning the presentation content includes learning the presentation content by acquiring first voice data uttered by the presenter and extracting first feature values of a first voice from the first voice data, wherein the command voice recognition, determination and classification model is stored in a 5G network, wherein the command voice recognition, determination and classification model is configured to receive, via the 5G network, the information related to the situation in which the command voice of the presenter is recognized and transmit, via the 5G network, a result of applying the command voice of the presenter to the command voice recognition, determination and classification model, and wherein the information related to the situation in which the command voice of the presenter is recognized is transmitted via the 5G network based on the DCI.

\* \* \* \* \*